Nov. 2, 1926.
W. T. McNINCH
ROLL FOR GYRATORY MILLS
Original Filed Dec. 1, 1924
1,605,050
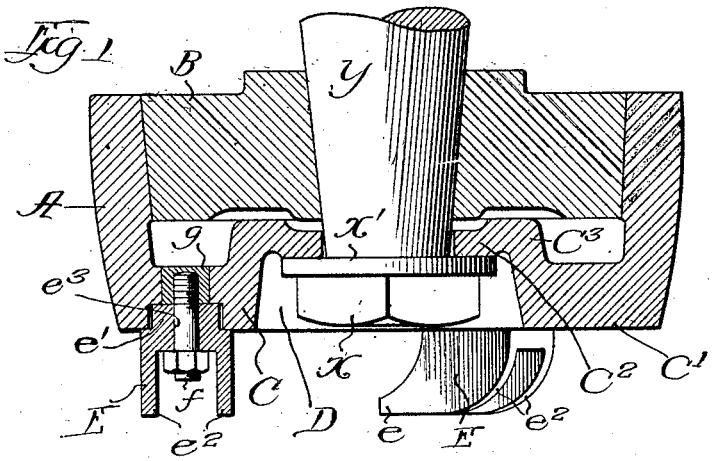
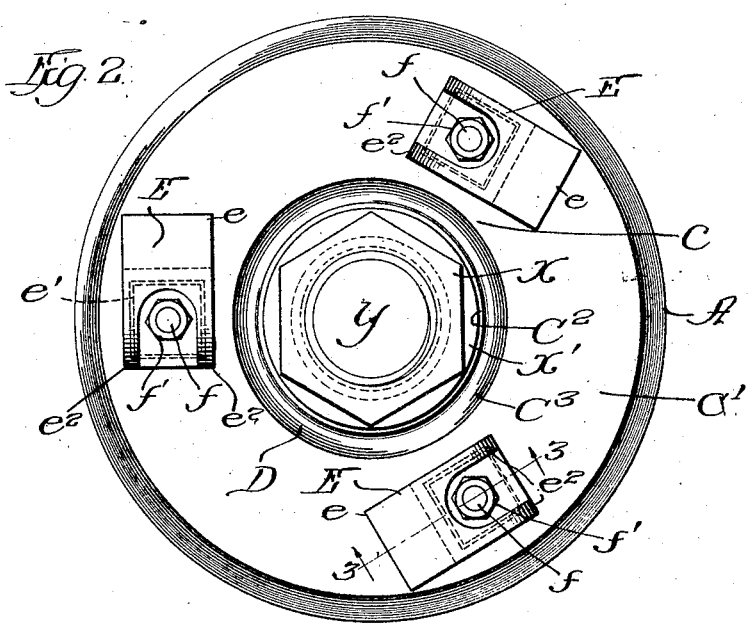
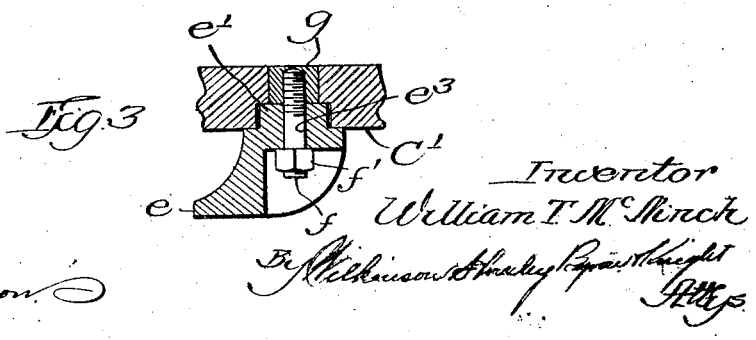
Inventor
William T. McNinch Patented Nov. 2, 1926.

1,605,050

UNITED STATES PATENT OFFICE.

WILLIAM T. McNINCH, OF CHICAGO HEIGHTS, ILLINOIS, ASSIGNOR TO AMERICAN MANGANESE STEEL COMPANY, OF CHICAGO, ILLINOIS, A CORPORATION OF MAINE.

ROLL FOR GYRATORY MILLS.

Original application filed December 1, 1924, Serial No. 753,018. Divided and this application filed November 7, 1925. Serial No. 67,483.

This application is a division of application Serial No. 753,018, filed December 1, 1924, and relates to mills intended primarily for crushing mineral substances, for instance, ore, cement clinker, and the like, and which embody in their organization a runner or roll adapted to travel in an orbital path, as by mounting it upon a gyratory shaft, and at the same time adapted to rotate about its own axis as it traverses the surface of a stationary ring against which it presses by centrifugal force, and particularly to rolls of the kind described in which the rim or wearing portion is made of harder material than the hub portion through which the roll is mounted upon the shaft.

The object of the invention is to provide an improved construction of rolls of the kind described, and particularly a construction in which the life of the wearing rim will be prolonged, and the hub portion, through which the roll is mounted upon its shaft, may be more securely assembled with the rim portion; also, if desired, the roll may have mounted upon it, more advantageously, agitators employed for stirring the material upon which the mill acts and causing it to enter the crushing space. Accordingly, the invention consists in forming the rim portion of the roll with an integral hub portion in addition to the separately formed hub portion of different metal assembled therewith, so that the separately formed hub member and integral hub member may be drawn together in securing the assembly of the separately formed hub member with the rim member, and, if desired, the integral hub member may serve as a web in which agitators are mounted.

In the accompanying drawing—

Figure 1 is a vertical axial section, and Figure 2 a bottom plan view of a roll embodying the several features of the invention.

Figure 3 is a sectional detail view of one of the agitators and a portion of the web of the integral hub member in which the agitators are mounted.

A represents the wearing rim of the roll of a gyratory mill, which comprises also in its construction the separately formed hub member B fitted to an inclined or conic surface within the rim member A and a hub member C which is formed integrally with said rim member, said hub members being, respectively, provided with central openings or bores which adapt them to be mounted upon a shaft or other member which may be employed for drawing them together and assuring the assembly of the separately formed hub member B with the rim member A. The integral hub member C is preferably designed with an outer annular web portion $C'$ and an inner annular web portion $C^2$, which are offset one from another in the direction of the axis of the roll and united by the frusto conical offset $C^3$, the effect being to produce a cavity D which will accommodate any means that may be employed for drawing the two hub members together and maintaining the assembly, for instance, the nut X and its interposed washer $X'$ on the threaded end of the tapered shaft Y.

E represents agitators mounted upon the under surface of the roll, the width of the outer annular web portion $C'$, in such numbers as may be required for stirring up the material to be acted upon. These agitators may be of any preferred construction, for instance, that described and claimed in the aforesaid application of which this is a division, and according to which, each agitator consists of a claw or plow having a concaved or forwardly and downwardly inclined front surface developing a toe $e$, a seating base $e'$, and walls $e^2$ beneath said base; said walls providing a housing to protect the means through which the agitator is secured to the roll, for instance, tap screw $f$ carrying a nut $f'$ beneath the agitator and passing through the opening $e^3$ in the base of the agitator, into the metal plug $g$ which is fixed in the web $C'$ of the integral hub.

In practice, the rim A, together with its integral hub member C will be formed of manganese steel, while the separately formed and assembled hub member B will be made of carbon steel in order to facilitate its production. Plugs $g$ are also made of carbon steel in order to facilitate drilling and threading them into the tap screws $f$; said plugs being fixed in position, for instance, by locating them as core members in the mold in which the manganese steel portion of the roll is cast.

I claim:

1. A roll for grinding mills, comprising an axially extending hollow rim member constructed with a hub portion, and a separately formed hub portion fitting within said rim member and assembled therewith.

2. A roll for grinding mills, comprising a hollow rim member, a web portion integral with said rim member, a hub member separately formed and assembled through means of taper surfaces with said rim member, and means engaging said web member and said hub member and drawing them together in the direction of the axis of the roll.

3. A roll for grinding mills, comprising a hollow rim member constructed with a web portion at one end thereof, and an integral web-like member at the other end therof, said rim member having at its other end a tapered annular inner surface, a separately formed disk-like hub member fitted to and seating against said tapered inner surface, and a shaft seated in one of said hub members carrying adjustable means bearing against the other of said hub members and adapted to draw the separately formed hub member to its seat.

4. A roll for grinding mills, comprising a rim member, a web portion integral with said rim member, a hub member separately formed and assembled with said rim member, and agitators mounted on said web member; said web portion having incorporated therein plugs of different material from that of the web portion; and said agitators having securing means entering said plugs.

5. A roll for grinding mills, comprising a rim member, a separately formed hub member assembled with said rim member, and a hub portion integral with said rim member; the separately formed hub member and the integral hub portion having means for drawing them together to secure the assembly of the separately formed hub member with the rim member; the integrally formed hub portion comprising an outer annular web and an inner annular web offset one from the other in the direction of the axis of the roll, and providing a cavity for the reception of means employed for drawing the hub member and hub portion together.

Signed at Chicago Heights, Illinois, this 2nd day of November, 1925.

W. T. McNINCH.